United States Patent
Mizukami (10) Patent No.: US 6,950,726 B2
(45) Date of Patent: Sep. 27, 2005

(54) METHOD AND DEVICE FOR NUMERICAL CONTROL RETURN TO ORIGIN OF A MASTER AND SLAVE SHAFT

(75) Inventor: Yuuji Mizukami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 165 days.

(21) Appl. No.: 10/363,670

(22) PCT Filed: Jan. 17, 2002

(86) PCT No.: PCT/JP02/00276

§ 371 (c)(1),
(2), (4) Date: Mar. 6, 2003

(87) PCT Pub. No.: WO03/060616

PCT Pub. Date: Jul. 24, 2003

(65) Prior Publication Data

US 2004/0232870 A1 Nov. 25, 2004

(51) Int. Cl.$^7$ .............................................. G05B 19/18
(52) U.S. Cl. ......................... 700/275; 700/57; 700/61; 318/600; 318/626
(58) Field of Search ...................... 700/56–58, 61–64, 700/247, 275; 318/600–603, 626, 618

(56) References Cited

U.S. PATENT DOCUMENTS

| | | | | |
|---|---|---|---|---|
| 4,559,798 A | * | 12/1985 | Hayashi et al. ................. | 72/81 |
| 4,604,560 A | * | 8/1986 | Inagaki et al. ............... | 318/567 |
| 4,847,777 A | * | 7/1989 | Konno ........................ | 700/192 |
| 4,906,908 A | * | 3/1990 | Papiernik et al. ........... | 318/600 |
| 5,070,288 A | * | 12/1991 | Ikeda et al. .................. | 318/618 |
| 5,309,074 A | * | 5/1994 | Mizukami .................... | 318/571 |
| 5,391,970 A | * | 2/1995 | Chaffee et al. .............. | 318/618 |
| 5,949,681 A | * | 9/1999 | Asai et al. ................... | 700/113 |
| 6,018,685 A | * | 1/2000 | Fujita et al. .................. | 700/61 |
| 6,107,769 A | * | 8/2000 | Saylor et al. ................ | 318/600 |
| 6,794,842 B2 | * | 9/2004 | Sano .......................... | 318/567 |
| 2001/0002509 A1 | * | 6/2001 | Suhara ........................ | 29/834 |

FOREIGN PATENT DOCUMENTS

| | | |
|---|---|---|
| JP | 63-602 | 1/1988 |
| JP | 4-130501 A | 5/1992 |
| JP | 8-22313 A | 1/1996 |
| JP | 2000-5822 | 1/2000 |

OTHER PUBLICATIONS

International Search Report of PCT/JP02/00276 dated Apr. 23, 2002.

* cited by examiner

*Primary Examiner*—Paul Rodriguez
(74) *Attorney, Agent, or Firm*—Sughrue Mion, PLLC (57) ABSTRACT

A numerical control apparatus for controlling a machine having two moving shafts placed in parallel and separate servomotors 6 and 10 for driving one of the shafts as a master shaft and the other as a slave shaft in the same direction and performing return to origin of the above-mentioned master shaft and the slave shaft according to a dog technique. The numerical control apparatus comprises position determination module determining the positional relationship as to whether or not the master shaft is ahead of the slave shaft, and return-to-origin management module performing return to origin of the master shaft and the slave shaft with one dog based on the determined positional relationship, so that the return to origin of the master shaft and the slave shaft can be performed with one dog. Moreover, the return to origin can be performed reliably at parallel positions.

18 Claims, 10 Drawing Sheets

METHOD AND DEVICE FOR NUMERICAL CONTROL RETURN TO ORIGIN OF A MASTER AND SLAVE SHAFT

TECHNICAL FIELD

This invention relates to a numerical control method and its apparatus for controlling a machine having two moving shafts placed in parallel and separate servomotors for driving one of the shafts as a master shaft and the other as a slave shaft in the same direction and in particular to control for performing return to origin of the master shaft and the slave shaft according to a dog technique.

BACKGROUND ART

A numerical control apparatus performs return to origin to precisely grasp the origin on a machine coordinate system in the numerical control apparatus.

As a method of the return to origin, a technique for placing a limit switch for deceleration (dog) in the vicinity of the origin of a machine moving part is available. In the technique, when the machine moving part steps on the dog, a deceleration command is given to a servomotor and a shift is made by the origin shift amount of the difference between the origin and the grid position from the point in time at which the first grid position is reached leaving the dog, thereby stopping the movement of the shaft. The grid is based on a Z phase pulse output every revolution from an encoder placed in the servomotor.

Figure 6:
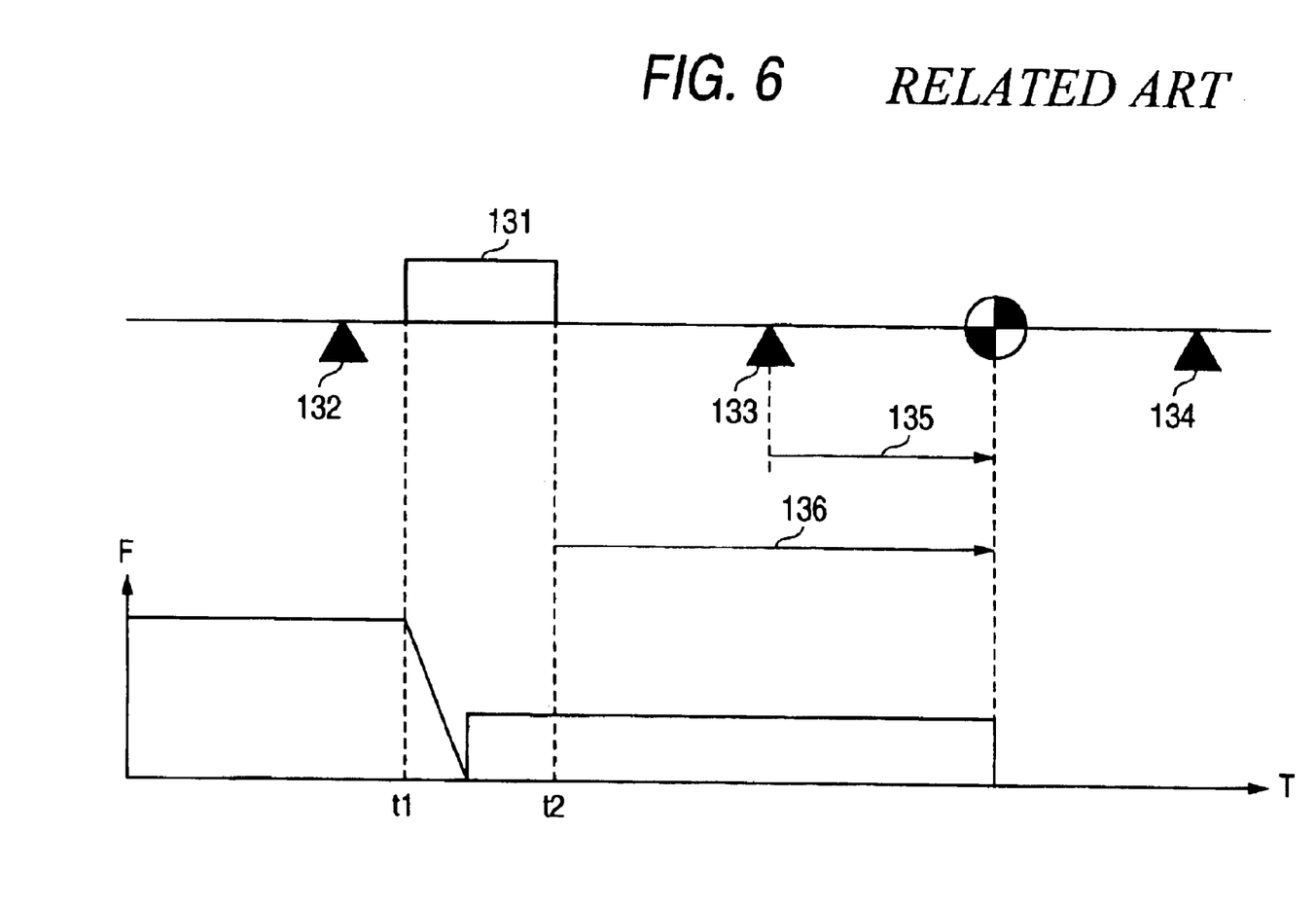
FIG. 6 is a drawing to describe the return-to-origin operation of a dog technique.

FIG. 6 is a drawing to describe the return-to-origin processing method of the dog technique. In the figure, numeral 131 denotes a dog, numerals 132, 133, and 134 are grids, numeral 135 denotes an origin shift amount, and numeral 136 denotes a distance remote from the dog to the first grid and adding the origin shift amount 135. As the origin shift amount 135, a previous measurement value is preset in parameter memory of the numerical control apparatus as a parameter.

At time t1 at which the machine moving part steps on the dog 131, a deceleration command is given to the servomotor for once stopping and then a move is started at sufficiently low speed (creep speed). When the dog 131 is left at time t2, a distance 136 of adding the distance from the position where the dog 131 is left to the first grid 133 and the origin shift amount 135 is calculated and the shaft move is stopped at the position. Accordingly, the shaft can be stopped precisely at the origin.

Figure 7:
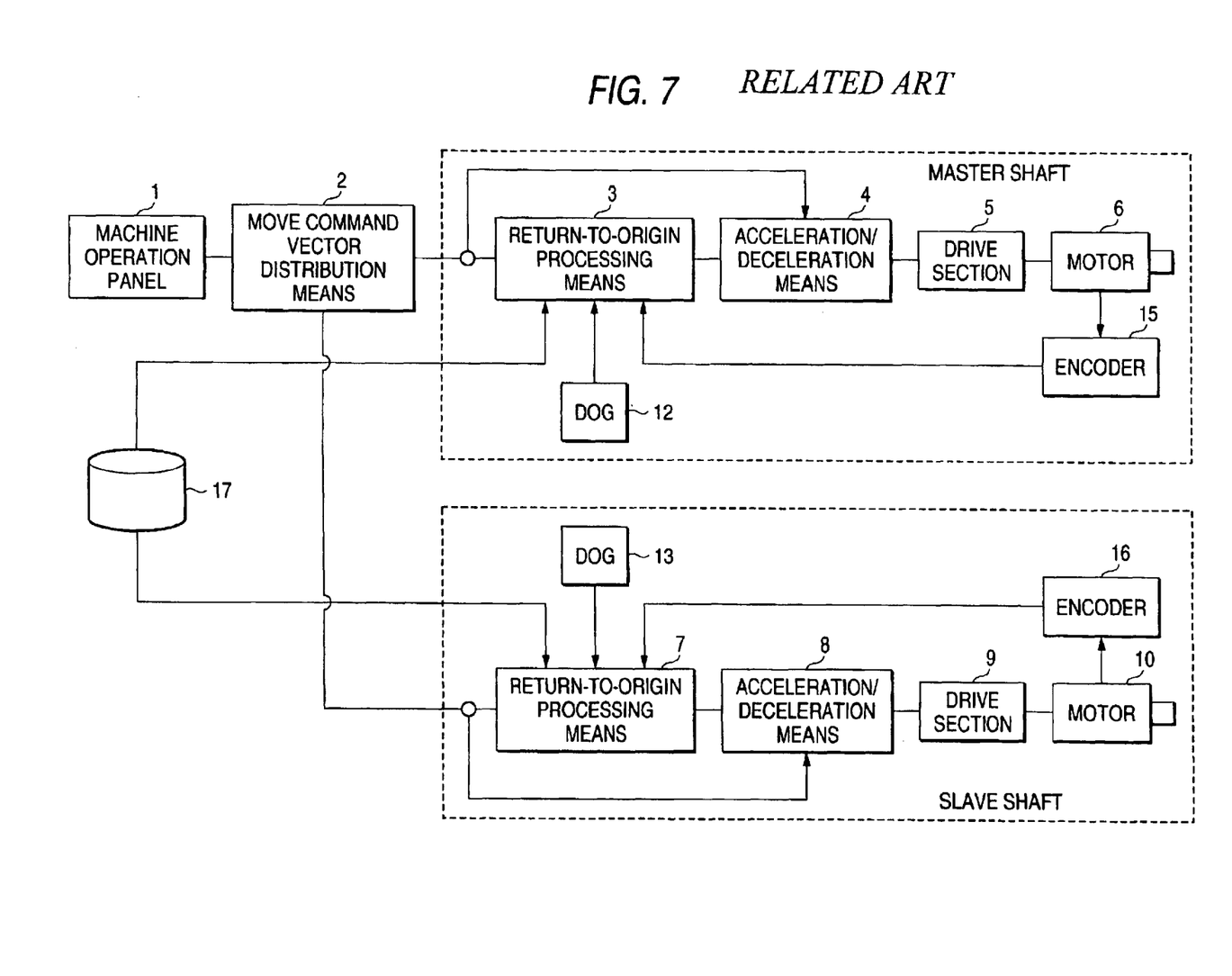
FIG. 7 is a diagram to show the configuration of a numerical control apparatus in a related art for controlling a machine having a master shaft and a slave shaft.
Figure 8A:
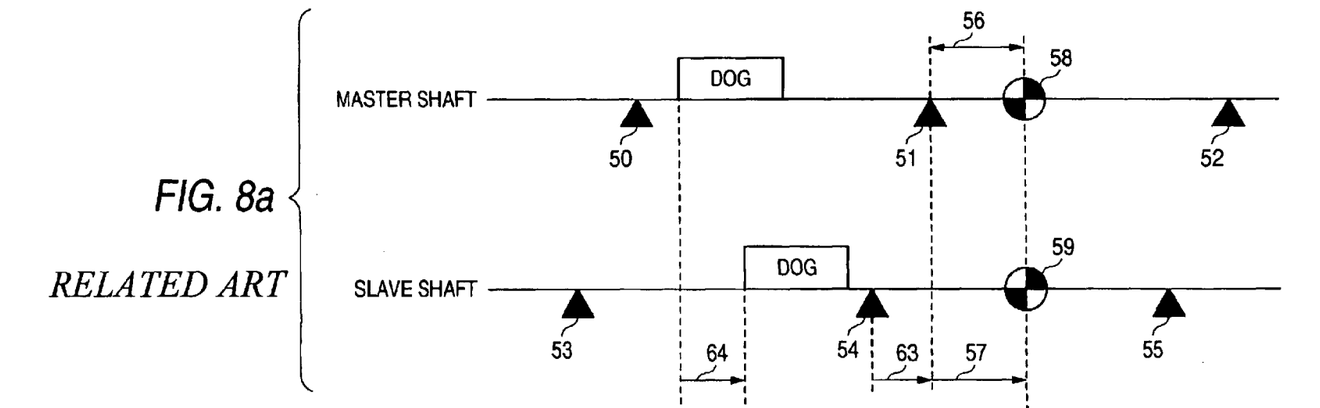
FIGS. 8a and 8b are drawings to show the return-to-origin operation of the numerical control apparatus in the related art for controlling a machine having a master shaft and a slave shaft.
Figure 8B:
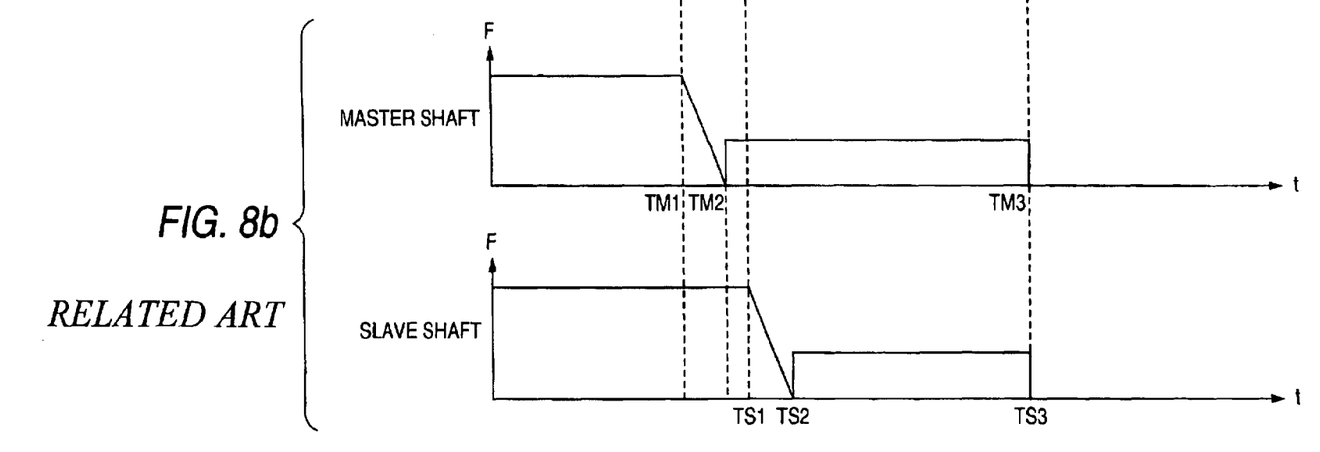

FIGS. 7 and 8 are drawings to describe a return-to-origin processing method in a related art in a numerical control apparatus for controlling a machine tool having a master shaft and a slave shaft (a machine having the two moving shafts placed in parallel and separate servomotors for driving one of the shafts as the master shaft and the other as the slave shaft in the same direction).

In FIG. 7, numeral 1 denotes a machine operation panel, numeral 2 denotes a move command vector distribution means, numeral 3 denotes return-to-origin processing means of the master shaft, numeral 4 denotes acceleration/deceleration means of the master shaft, numeral 5 denotes a drive section of the master shaft, numeral 6 denotes a servomotor of the master shaft, numeral 12 denotes a dog of the master shaft, numeral 15 denotes an encoder of the master shaft, numeral 7 denotes return-to-origin processing means of the slave shaft, numeral 8 denotes acceleration/deceleration means of the slave shaft, numeral 9 denotes a drive section of the slave shaft, numeral 10 denotes a servomotor of the slave shaft, numeral 13 denotes a dog of the slave shaft, numeral 16 denotes an encoder of the slave shaft, and numeral 17 denotes a parameter storage area for storing the origin shift amount, etc.

A return-to-origin command input through the machine operation panel 1 is sent to the move command vector distribution means 2, which then outputs move commands to the master shaft and the slave shaft. At this time, the move commands given to the master shaft and the slave shaft are set to have the same return-to-origin speed parameters are, for example. When a dog on signal is input from the dog 12, the return-to-origin processing means 3 of the master shaft cancels the move command of the master shaft and causes the master shaft to start to move at creep speed after stop with deceleration. When the dog is turned off (a limit switch leaves the dog), the return-to-origin processing means 3 acquires the distance to the current nearest grid from the encoder 15, moves the master shaft at creep speed at the distance of the distance from the dog off position to the nearest grid plus the origin shift amount of the master shaft stored in the parameter storage area 17 as the final move distance, and stops the master shaft when the master shaft has been moved at the move distance.

On the other hand, as for the slave shaft, when a dog on signal is input from the dog 13 to the return-to-origin processing means 7 of the slave shaft independently of the master shaft, the return-to-origin processing means 7 cancels the move command of the slave shaft and causes the slave shaft to start to move at creep speed after stop with deceleration. When the dog is turned off (limit switch leaves the dog), the return-to-origin processing means 7 acquires the distance to the nearest grid from the encoder 16, moves the slave shaft at creep speed at the distance of the distance from the dog off position to the nearest grid plus the origin shift amount of the slave shaft stored in the parameter storage area 17 as the final move distance, and stops the slave shaft when the slave shaft has been moved at the move distance.

By the way, in the numerical control apparatus for controlling the machine tool having the master shaft and the slave shaft, the origins of the shafts need to be made parallel. If return to origin is executed in a state in which the dogs 12 and 13 of the master shaft and the slave shaft are shifted in position, the move speed of the master shaft and that of the slave shaft are placed out of synchronization and thus the dogs 12 and 13 of the master shaft and the slave shaft need to be attached to parallel positions.

FIGS. 8a and 8b are drawings to describe this point in detail. FIG. 8a is a drawing to represent the positional relationship between the grids and the dogs of the master shaft and the slave shaft. FIG. 8b is a drawing to show the speed and time when return to origin is made when the grids and the dogs are at positions as in FIG. 8a.

In FIG. 8b, the vertical axis indicates the speed and the horizontal axis indicates the time.

In FIG. 8a, numerals 50, 51, and 52 denote grids of the master shaft, numerals 53, 54, and 55 denote grids of the slave shaft, numeral 63 denotes the grid position shift amount between the master shaft and the slave shaft, numeral 64 denotes the dog position shift amount between the master shaft and the slave shaft, numeral 56 denotes the origin shift amount of the master shaft, numeral 57 denotes the origin shift amount of the slave shaft (the distance between the grid 54 and origin 59), numeral 58 denotes the origin of the master shaft, and numeral 59 denotes the origin of the slave shaft.

To execute return to origin, as in FIG. 8b, the master shaft steps on the dog at time TM1 and is decelerated. After completion of the deceleration, the master shaft enters creep speed at time TM2. On the other hand, the slave shaft steps on the dog at time TS1 and is decelerated. After completion of the deceleration, the slave shaft enters creep speed at time TS2. If the dogs of the master shaft and the slave shaft are shifted in position as shown in the figure, when return to origin is executed, the speeds of the master shaft and the slave shaft are not synchronized between the times TM1 and TS2.

Thus, in the related art, the dogs of the shafts need to be attached to parallel positions as much as possible, namely, the dog position shift amount 64 shown in FIG. 8a needs to be set to almost 0 and it is very difficult to adjust it.

A related art to the invention is disclosed in JP-A-8-22313. In the related art, the grid position shift amount between a master shaft and a slave shaft is calculated, the return-to-origin operation is performed based on a preset grid shift amount for the master shaft, and the return-to-origin operation of the master shaft and the slave shaft is performed based on the value resulting from adding grid shift amount and the position shift amount for the slave shaft, whereby the return-to-origin operation of the master shaft and the slave shaft is performed to precise positions.

However, in the return-to-origin method in the related art, if the number of dogs is one, a defective condition of the possibility of return to one-grid erroneous origin position may occur depending on the positional relationship between the master shaft and the slave shaft when the power is turned on.

Figure 9:
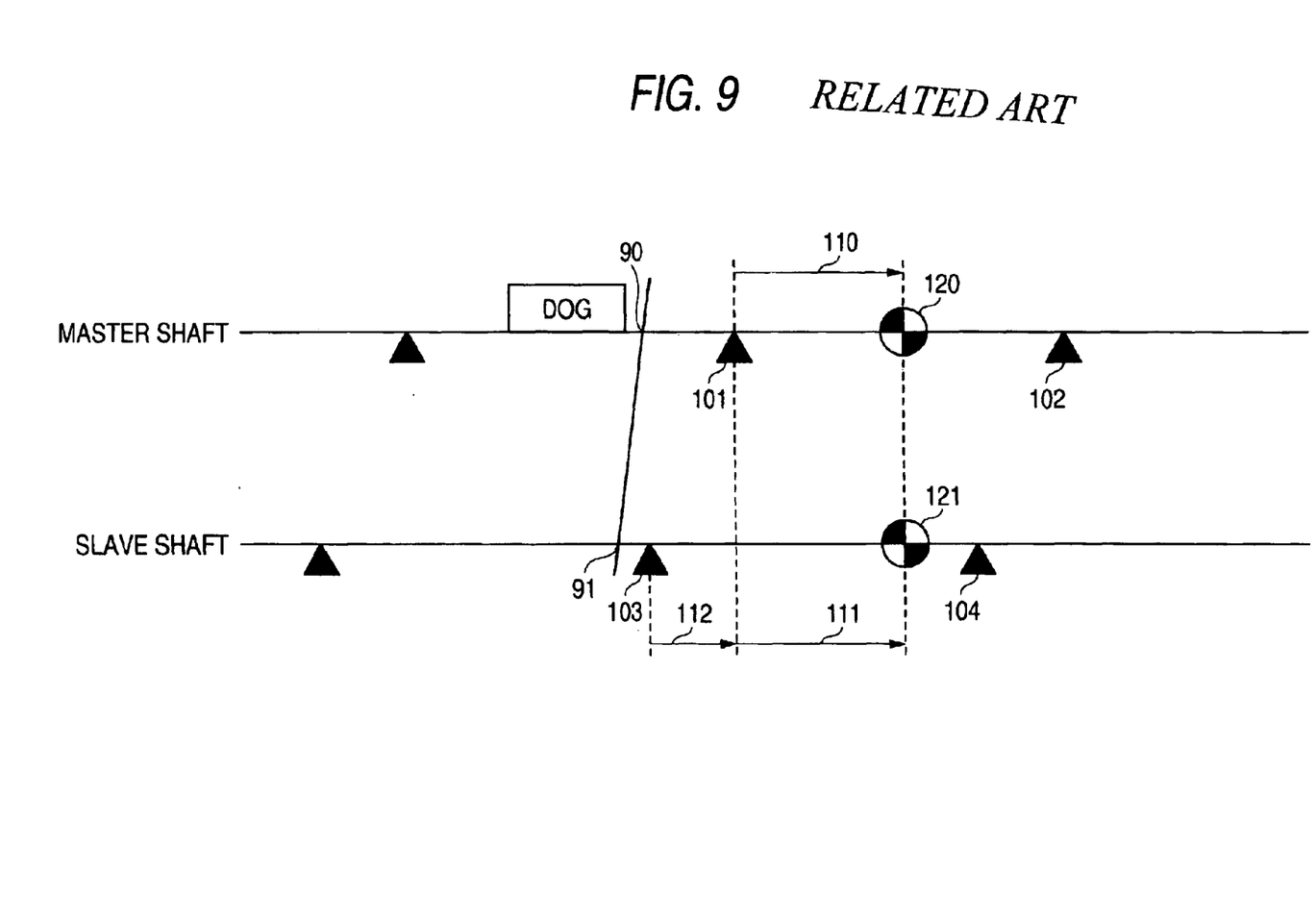
FIG. 9 is a drawing to describe the case where origin positions are not erroneous if the number of dogs is one in a numerical control apparatus in a different related art for controlling a machine having a master shaft and a slave shaft.
Figure 10:
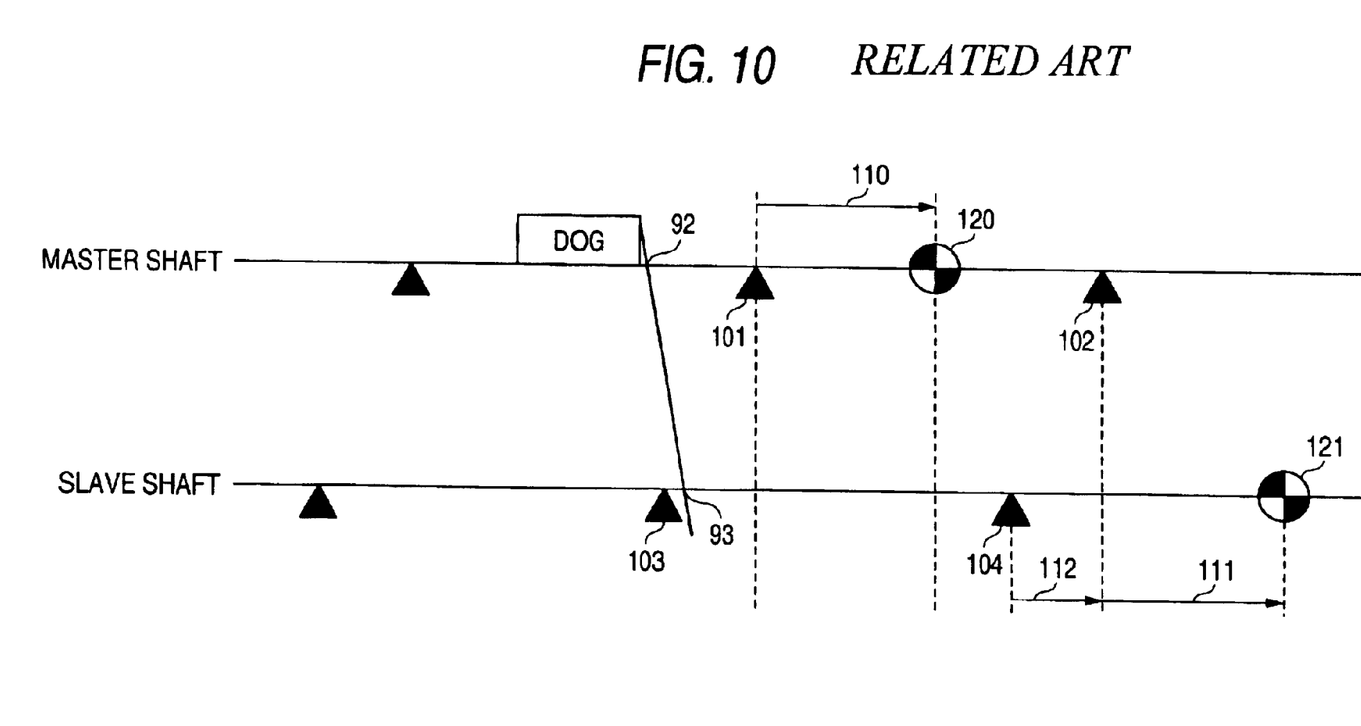
FIG. 10 is a drawing to describe the case where origin positions are erroneous if the number of dogs is one in the numerical control apparatus in the different related art for controlling a machine having a master shaft and a slave shaft.

FIGS. 9 and 10 are drawings to show the above-mentioned defective condition.

In FIG. 9, numeral 90 denotes the position of the master shaft after the dog is turned off, numeral 91 denotes the position of the slave shaft after the dog is turned off, numerals 101 and 102 denote grids of the master shaft, numerals 103 and 104 denote grids of the slave shaft, and numerals 110 and 111 denote the origin shift amounts of the master shaft and the slave shaft. The original shift amounts of the master shaft and slave shaft 110 and 111 are set to the same values. Numeral 112 denotes the grid position shift amount between the master shaft and the slave shaft, and numerals 120 and 121 denote the origins of the master shaft and the slave shaft.

If the positional relationship between the master shaft and the slave shaft after the dog is turned off is the positional relationship of 90 and 91 as in FIG. 9, the first grids of the shafts after the dog is turned off are 101 and 103. Therefore, the master shaft stops at the position shifted by the origin shift amount 110 from the grid 101 and the slave shaft stops at the position shifted by the grid position shift amount 112 between the master shaft and the slave shaft plus the origin shift amount 111 from the grid 103; the shafts return to the origins at parallel positions.

However, if the positional relationship between the master shaft and the slave shaft after the dog is turned off is the positional relationship of 92 and 93 as in FIG. 10, the first grids of the shafts after the dog is turned off become 101 and 104.

Thus, the master shaft stops at the position shifted by the origin shift amount 110 from the grid 101 and the slave shaft stops at the position shifted by the grid position shift amount 112 between the master shaft and the slave shaft plus the origin shift amount 111 from the grid 104.

Therefore, one-grid shift occurs between the origin 120 of the master shaft and the origin 121 of the slave shaft and the shafts cannot return to the origins at parallel positions; there is the possibility of destroying the machine.

DISCLOSURE OF THE INVENTION

The invention is intended for solving the problems as described above and it is an object of the invention to provide a numerical control method and its apparatus for facilitating origin adjustment work of a master shaft and a slave shaft and enabling return to origin reliably at parallel positions.

To accomplish the object, according to the invention, there is provided a numerical control method of controlling a machine having two moving shafts placed in parallel and separate servomotors for driving one of the shafts as a master shaft and the other as a slave shaft in the same direction and performing return to origin of the above-mentioned master shaft and the slave shaft according to a dog technique, wherein in return to origin, the positional relationship is determined as to whether or not the above-mentioned slave shaft is ahead of the master shaft toward the origin direction, and the return to origin of the above-mentioned master shaft and the slave shaft is performed with one dog based on the determination result.

In the invention, virtual grids are set in the above-mentioned slave shaft at positions parallel with grids of the above-mentioned master shaft, if the determination result of the positional relationship indicates that the above-mentioned slave shaft is behind the above-mentioned master shaft toward the origin direction, return to origin of the above-mentioned master shaft is performed based on the value resulting from adding the grid interval and an origin shift amount and return to origin of the slave shaft is performed based on the value resulting from adding the distance from the position of the slave when the above-mentioned master shaft arrives at the first grid from stepping on the dog to the first virtual grid, the grid interval, and an origin shift amount, and if the determination result of the positional relationship indicates that the above-mentioned slave shaft is ahead of the master shaft toward the origin direction, return to origin of the above-mentioned master shaft is performed based on the value resulting from adding the grid interval and the origin shift amount and return to origin of the above-mentioned slave shaft is performed based on the value resulting from adding the distance from the position of the slave when the master shaft arrives at the first grid from stepping on the dog to the first virtual grid and the origin shift amount.

In the invention, when the positional relationship is determined as to whether or not the above-mentioned slave shaft is ahead of the master shaft toward the origin direction, the determination is made based on the value of a counter of the slave shaft.

In the invention, if the value of the counter which is cleared each time a virtual grid of the slave shaft is passed through, and counts the grid interval of the slave shaft is grid interval/2<counter value≦grid interval when the master shaft is at the first grid position after the dog is turned off, it is determined that the above-mentioned slave shaft is behind the master shaft toward the origin direction, and if the value of the counter is 0≦counter value≦grid interval/2 when the master shaft is at the first grid position after the dog is turned off, it is determined that the above-mentioned slave shaft is ahead of the master shaft toward the origin direction.

In the invention, if the value of the counter which is cleared each time an intermediate point between virtual grids of the slave shaft is passed through, and counts the grid interval of the slave shaft is 0≦counter value≦grid interval/2 when the master shaft is at the first grid position after the dog is turned off, it is determined that the above-mentioned slave shaft is behind the master shaft toward the origin direction, and if the value of the counter is grid interval/2<counter value≦grid interval when the master shaft is at the first grid position after the dog is turned off, it is determined that the above-mentioned slave shaft is ahead of the master shaft toward the origin direction.

According to the invention, there is provided a numerical control apparatus for controlling a machine having two moving shafts placed in parallel and separate servomotors for driving one of the shafts as a master shaft and the other as a slave shaft in the same direction and performing return to origin of the above-mentioned master shaft and the slave shaft according to a dog technique, the numerical control apparatus comprising position determination means for determining the positional relationship as to whether or not the above-mentioned slave shaft is ahead of the master shaft toward the origin direction in return to origin, and return-to-origin management means for performing the return to origin of the above-mentioned master shaft and the slave shaft with one dog based on the determination result of the position determination means.

In the invention, virtual grids are set in the above-mentioned slave shaft at positions parallel with grids of the above-mentioned master shaft, if the determination result of the above-mentioned position determination means indicates that the above-mentioned slave shaft is behind the master shaft toward the origin direction, the above-mentioned return-to-origin management means performs return to origin of the above-mentioned master shaft based on the value resulting from adding the grid interval and an origin shift amount and performs return to origin of the above-mentioned slave shaft based on the value resulting from adding the distance from the position of the slave when the above-mentioned master shaft arrives at the first grid from stepping on the dog to the first virtual grid, the grid interval, and an origin shift amount, and if the determination result of the above-mentioned position determination means indicates that the above-mentioned slave shaft is ahead of the master shaft toward the origin direction, the above-mentioned return-to-origin management means performs return to origin of the above-mentioned master shaft based on the value resulting from adding the grid interval and the origin shift amount and performs return to origin of the above-mentioned slave shaft based on the value resulting from adding the distance from the position of the slave when the master shaft arrives at the first grid from stepping on the dog to the first virtual grid and the origin shift amount.

In the invention, the above-mentioned position determination means comprises a counter for counting the grid interval of the slave shaft and when determining the positional relationship as to whether or not the above-mentioned slave shaft is ahead of the master shaft toward the origin direction, the above-mentioned position determination means uses the above-mentioned counter to determine the positional relationship.

In the invention, the counter of the above-mentioned position determination means is a counter cleared each time a virtual grid of the slave shaft is passed through, and if the value of the counter is grid interval/2<counter value≦grid interval when the master shaft is at the first grid position after the dog is turned off, the above-mentioned position determination means determines that the above-mentioned slave shaft is behind the master shaft toward the origin direction, and if the value of the counter is 0≦counter value≦grid interval/2, the above-mentioned position determination means determines that the above-mentioned slave shaft is ahead of the master shaft toward the origin direction.

In the invention, the counter of the above-mentioned position determination means is a counter cleared each time an intermediate point between virtual grids of the slave shaft is passed through, and if the value of the counter is 0≦counter value≦grid interval/2 when the master shaft is at the first grid position after the dog is turned off, the above-mentioned position determination means determines that the above-mentioned slave shaft is behind the master shaft toward the origin direction, and if the value of the counter is grid interval/2<counter value≦grid interval, the above-mentioned position determination means determines that the above-mentioned slave shaft is ahead of the master shaft toward the origin direction.

BEST MODE FOR CARRYING OUT THE INVENTION

First Embodiment.

A first embodiment of a numerical control apparatus according to the invention will be discussed with FIGS. 1 to 5.

Figure 1:
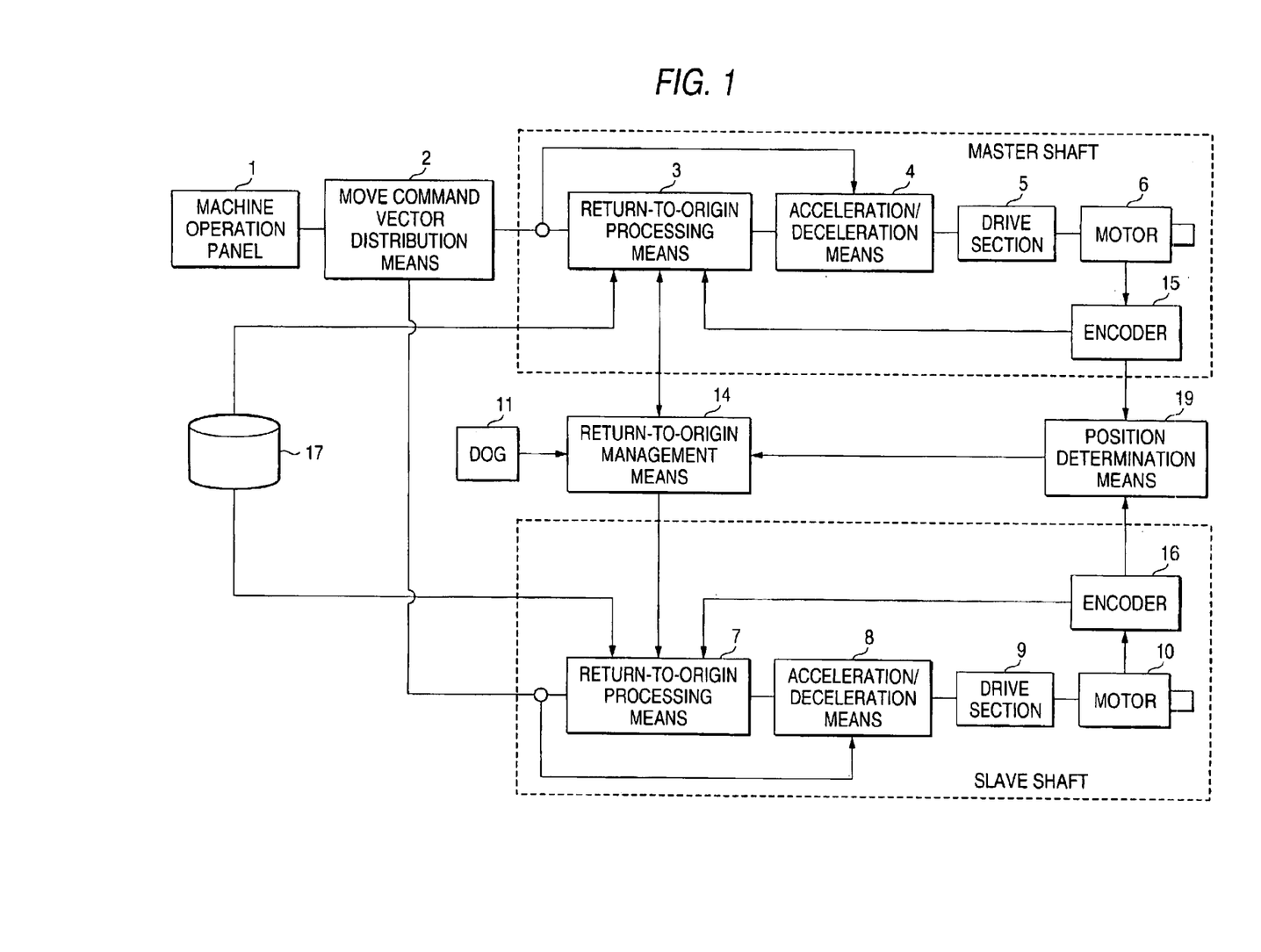
FIG. 1 is a diagram to show the configuration of a numerical control apparatus according to a first embodiment of the invention.

FIG. 1 is a block diagram to show the configuration related to return to origin of the numerical control apparatus according to the first embodiment of the invention. In FIG.

1, numeral 11 denotes a dog, which is installed only for a master shaft. Numeral 14 denotes return-to-origin management means and numeral 19 denotes position determination means. The detailed operation of the position determination means will be discussed later together with the detailed operation of the return-to-origin management means 14. Other components are similar to those in the related art.

Figure 2:
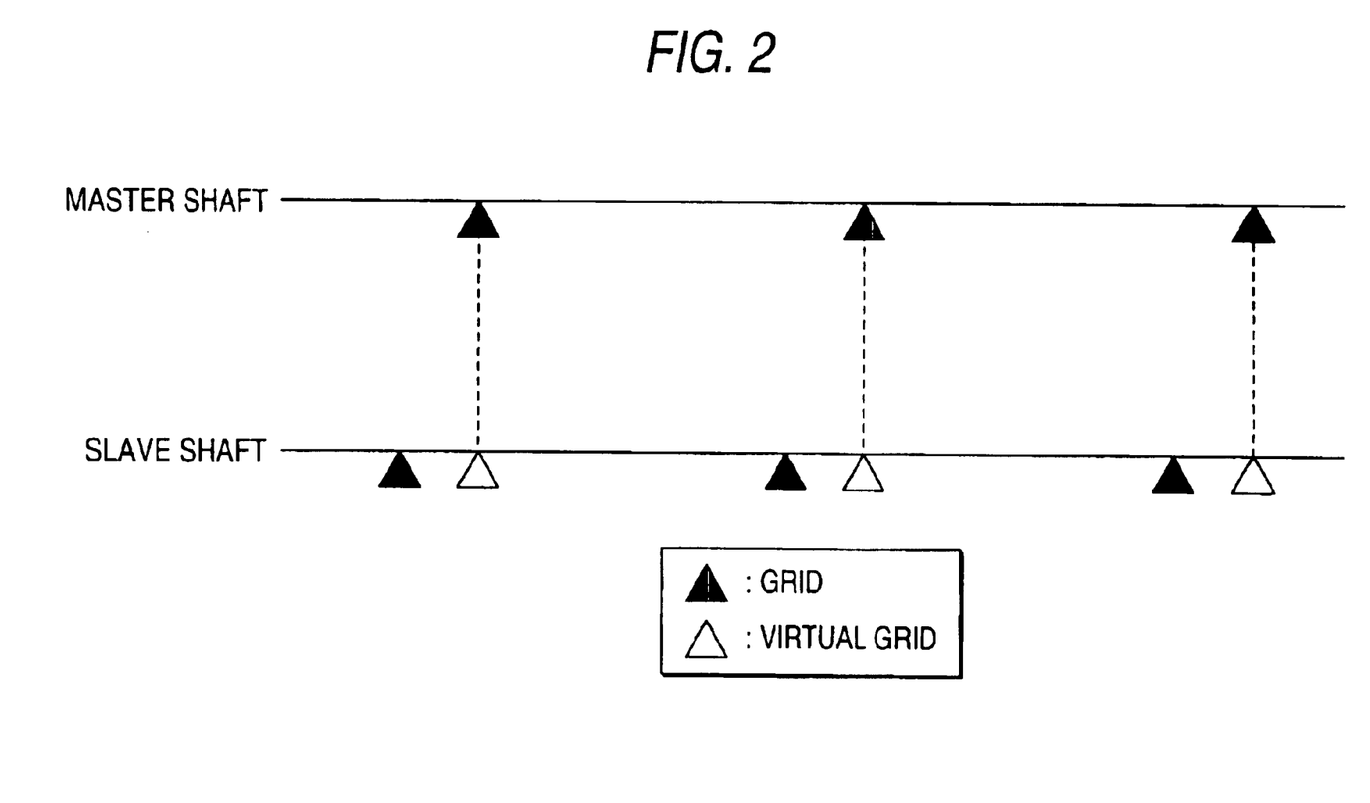
FIG. 2 is a drawing to describe virtual grids of a slave shaft of the numerical control apparatus according to the first embodiment of the invention.

FIG. 2 is a drawing to describe virtual grids of a slave shaft. In the first embodiment of the invention, the position determination means 19 first virtually prepares grids of the slave shaft (which will be hereinafter referred to as virtual grids) at positions parallel with grids of the master shaft as in FIG. 2. The virtual grids are prepared by offsetting by offset amount from grids of the slave shaft.

In the usual return to origin, the position moved by the origin shift amount from the first grid after the dog is turned off is set as the origin, but the origin in the first embodiment of the invention is the position moved by the origin shift amount from the second grid after the dog is turned off.

Figure 3:
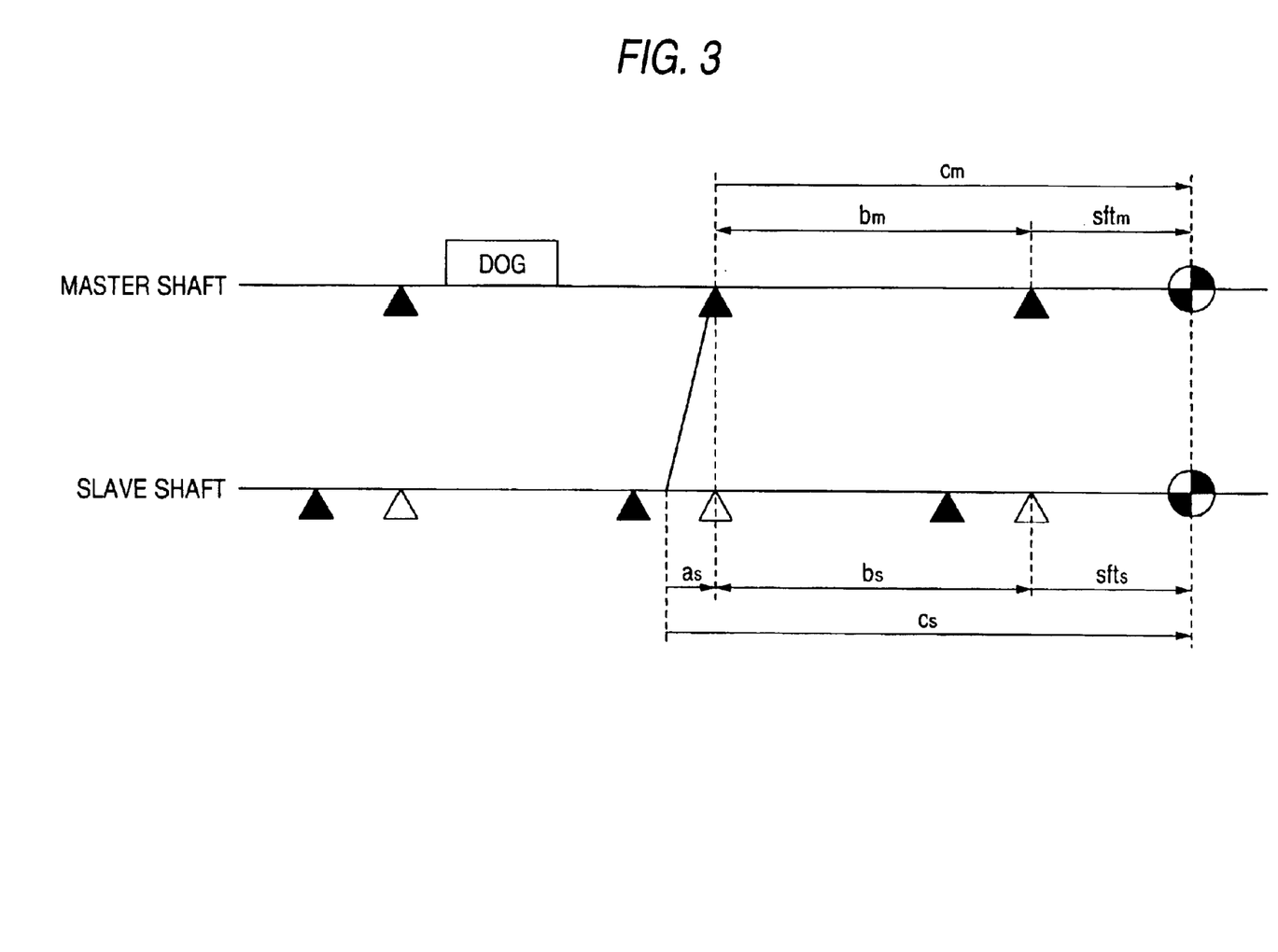
FIG. 3 is a drawing to show the move amounts to the origins of the shafts when the slave shaft is behind the master shaft in the numerical control apparatus according to the first embodiment of the invention.

In FIG. 1, when a dog on signal is input from the dog 11, the return-to-origin management means 14 once decelerates the master shaft and causes the master shaft to move at creep speed. At this time, the return-to-origin management means 14 also causes the slave shaft to move according to the same speed pattern in synchronization with the master shaft. When a dog off signal is input from the dog 11, the return-to-origin management means 14 acquires the distance to the nearest grid from an encoder 15 of the master shaft and moves the master shaft to the first grid. At this time, the return-to-origin management means 14 acquires the move amount per unit time from return-to-origin processing means 3 of the master shaft and sends the move amount to return-to-origin processing means 7 of the slave shaft, whereby the slave shaft moves in synchronization with the master shaft. Here, the return-to-origin management means 14 causes the position determination means 19 to determine whether the master shaft is at a position ahead of the slave shaft (the slave shaft is at a lag position behind the master shaft with respect to the return-to-origin direction) or the slave shaft is at a position ahead of the master shaft (the slave shaft is at a position leading the master shaft with respect to the return-to-origin direction), and calculates the move amounts to the origins of the shafts using data from encoders 15 and 16. The move amounts to the origins of the shafts vary depending on the positional relationship between the shafts as described below:

FIG. 3 is a drawing to show the move amounts to the origins of the shafts when the slave shaft is behind the master shaft. In such a positional relationship, letting the distance to the origin of the master shaft be $c_m$ and the distance to the origin of the slave shaft be $c_s$, $c_m = b_m + sft_m$   $b_m$: Grid interval of master shaft
   $sft_m$: Origin shift amount of master shaft
$c_s = a_s + b_s + sft_s$
   $a_s$: Distance from position of slave shaft when master shaft arrives at first grid to first virtual grid of slave shaft
   $b_s$: Grid interval of slave shaft
   $sft_s$: Origin shift amount of slave shaft (same value as origin shift amount of master shaft).

Figure 4:
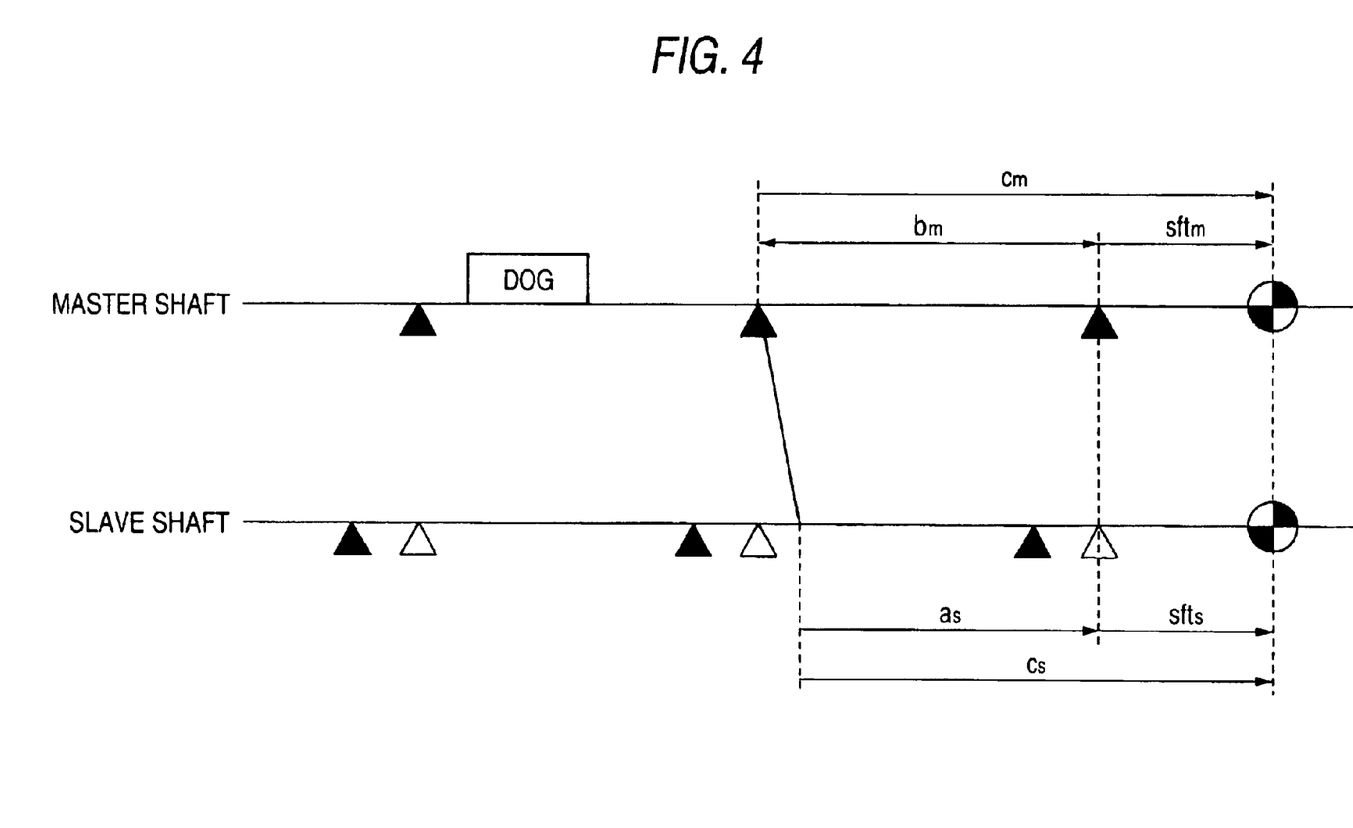
FIG. 4 is a drawing to show the move amounts to the origins of the shafts when the slave shaft is ahead of the master shaft in the numerical control apparatus according to the first embodiment of the invention.

FIG. 4 is a drawing to show the move amounts to the origins of the shafts when the slave shaft is ahead of the master shaft in the origin direction. In contrast, when the slave shaft is ahead of the master shaft as in FIG. 4, letting the distance to the origin of the master shaft be $c_m$ and the distance to the origin of the slave shaft be $c_s$, $c_m = b_m + sft_m$
$c_s = a_s + sft_s$ Using the remaining distance thus calculated, the master shaft moves at the remaining distance of the master shaft, whereby the master shaft can arrive at the origin of the master shaft. The slave shaft moves at the remaining distance of the slave shaft, whereby the slave shaft can arrive at the origin of the slave shaft.

Next, a method for the position determination means 19 to determine the positional relationship between the master shaft and the slave shaft, namely, whether the master shaft and the slave shaft have the positional relationship in FIG. 3 or FIG. 4 will be discussed.

The position determination means 19 can determine which shaft is ahead of the other assuming that the shift between the master shaft and the slave shaft is less than a half of a grid.

Figure 5:
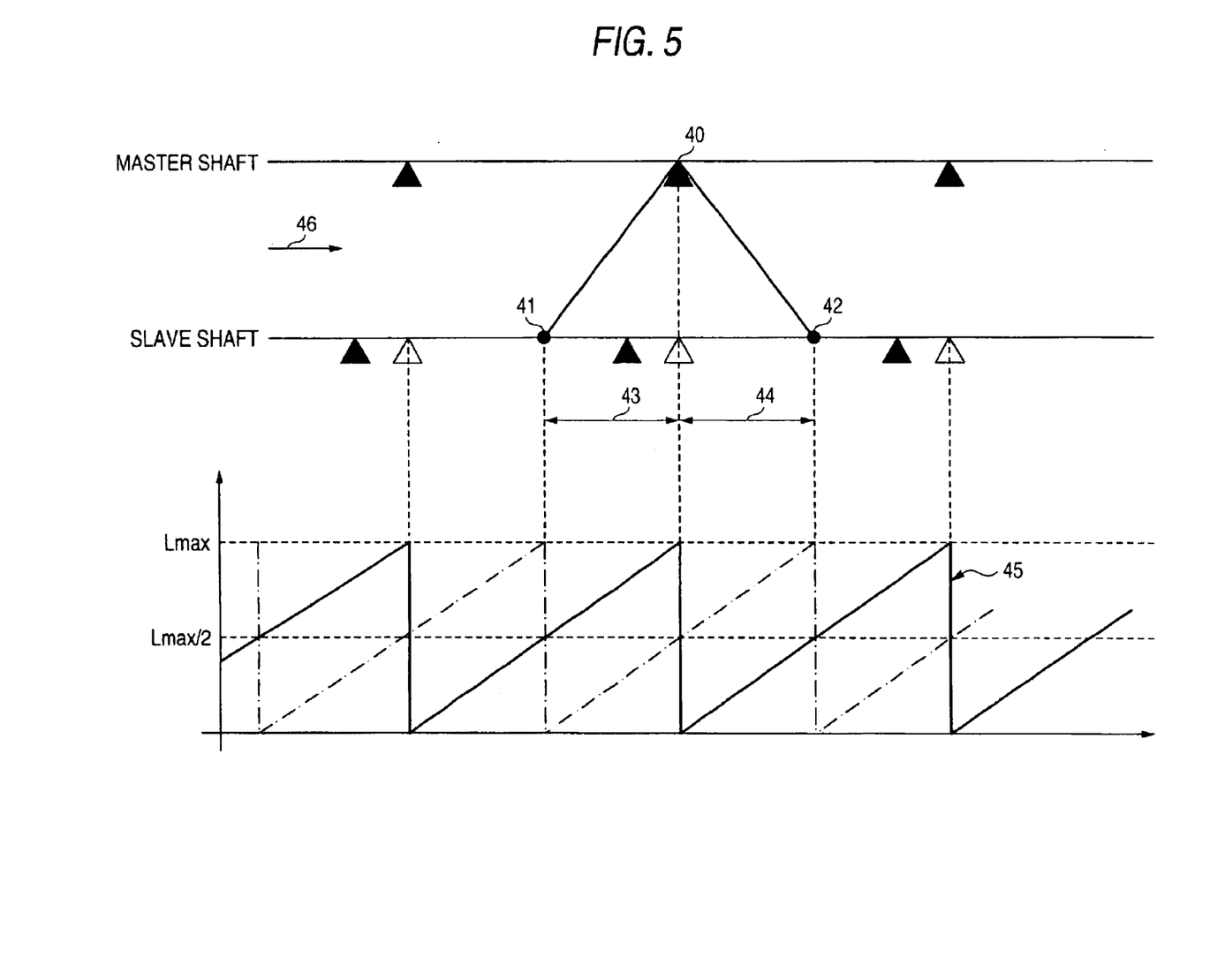
FIG. 5 is a drawing to describe a method of determining whether the slave shaft is ahead of or behind the master shaft in the numerical control apparatus according to the first embodiment of the invention.

FIG. 5 is a drawing to the determination method.

In FIG. 5, numeral 40 denotes the first grid after the dog is turned off in the master shaft, numerals 41 and 42 denote each an intermediate position between virtual grids in the slave shaft, and numeral 45 denotes a counter which is set to 0 at each virtual grid point of the slave shaft and indicates the distance to the next virtual grid; the maximum value becomes the grid interval (=Lmax). When the shafts move in the direction of an arrow 46, if the master shaft is at the position of 40 and the slave shaft is in an area of 43, namely, when the counter 45 value is Lmax/2<counter value≦Lmax, it can be determined that the slave shaft is behind the master shaft. In contrast, if the master shaft is at the position of 40 and the slave shaft is in an area of 44, namely, when the counter 45 value is 0≦counter value≦Lmax/2, it can be determined that the slave shaft is ahead of the master shaft.

To use a counter set to 0 at each intermediate point between the virtual grids of the slave shaft, namely, a counter as indicated by the chain line in FIG. 5 as the counter of the slave shaft, when the shafts move in the direction of the arrow 46, if the master shaft is at the position of 40 and the slave shaft is in the area of 43, namely, when the counter 45 value is 0≦counter value≦Lmax/2, it can be determined that the slave shaft is behind the master shaft. In contrast, if the master shaft is at the position of 40 and the slave shaft is in the area of 44, namely, when the counter 45 value is Lmax/2<counter value≦Lmax, it can be determined that the slave shaft is ahead of the master shaft.

As described above, according to the invention, in the numerical control apparatus for executing return to origin of the master shaft and the slave shaft according to the dog technique, it is made possible to execute return to origin using only one dog and thus origin adjustment work is facilitated. Moreover, in return to origin, the positional relationship is determined as to whether or not the slave shaft is ahead of the master shaft toward the origin direction, so that it is made possible to reliably execute return to origin at parallel positions.

INDUSTRIAL APPLICABILITY

The numerical control method and its apparatus according to the invention are suited for performing return to origin of the master shaft and the slave shaft according to the dog technique when performing return to origin of a machine having two moving shafts placed in parallel and separate servomotors for driving one of the shafts as the master shaft and the other as the slave shaft in the same direction.

What is claimed is:

1. A numerical control method for controlling a machine having two moving shafts placed in parallel and separate servomotors each driving one of the two shafts, the method comprising:

driving the two shafts in same direction, where one of the two shafts is a master shaft and the other is a slave shaft; and performing a return to origin of the master shaft and the slave shaft according to a dog technique, wherein performing the return to the origin comprises determining a positional relationship as to whether or not the slave shaft is ahead of the master shaft in an origin direction, and performing the return to the origin of the master shaft and the slave shaft with a single dog based on the determined positional relationship.

2. The numerical control method as claimed in claim 1, further comprising:

setting virtual grids in the slave shaft at positions parallel to grids of the master shaft, wherein when the determined positional relationship indicates that the slave shaft is behind the master shaft in the origin direction:

calculating a first value by adding a grid interval amount of the master shaft and an origin shift amount, returning the master shaft to the origin based on the first calculated value, calculating a second value by adding a distance from a position of the slave shaft when the master shaft arrives at a first one of the grids after stepping on the single dog to a position of the slave shaft when the slave shaft arrives at a first one of the virtual grids, a virtual grid interval amount of the slave shaft, and the origin shift amount, and returning the slave shaft to the origin based on the second calculated value, wherein when the determined positional relationship indicates that the slave shaft is ahead of the master shaft in the origin direction:

calculating the first value by adding the grid interval amount of the master shaft and the origin shift amount, returning the master shaft to the origin based on the first calculated value, calculating the second value by adding the distance from the position of the slave shaft when the master shaft arrives at the first grid after stepping on the single dog to the position of the slave shaft when the slave shaft arrives at the first virtual grid and the origin shift amount, returning the slave shaft to the origin based on the second calculated value.

3. The numerical control method as claimed in claim 2, wherein said determining the positional relationship is based on a value of a counter of the slave shaft.

4. The numerical control method as claimed in claim 3, wherein:

the counter counts the virtual grid interval amount of the slave shaft and the value of the counter is cleared each time the slave shaft passes through one of the virtual grids, if the value of the counter is the virtual grid interval amount divided by two < the counter value ≦ the virtual grid interval amount when the master shaft is at the first grid after the single dog is turned off, the determined positional relationship is that the slave shaft is behind the master shaft in the origin direction, and if the value of the counter is 0≦ the counter value ≦ the virtual grid interval amount divided by two when the master shaft is at the first grid after the single dog is turned off, the determined positional relationship is that the slave shaft is ahead of the master shaft in the origin direction.

5. The numerical control method as claimed in claim 3, wherein:

the counter counts the virtual grid interval amount of the slave shaft and the value of the counter is cleared each time the slave shaft passes through an intermediate point between the virtual grids, if the value of the counter is 0 ≦ the counter value ≦ the virtual grid interval amount divided by two when the master shaft is at the first grid after the single dog is turned off, the determined positional relationship is that the slave shaft is behind the master shaft in the origin direction, and if the value of the counter is the virtual grid interval amount divided by two < the counter value ≦ the virtual grid interval amount when the master shaft is at the first grid after the single dog is turned off, the determined positional relationship is that the slave shaft is ahead of the master shaft in the origin direction.

6. The numerical control method as claimed in claim 1, wherein said determining the positional relationship is based on a value of a counter of the slave shaft.

7. The numerical control method as claimed in claim 6, wherein:

the counter counts a virtual grid interval amount of the slave shaft and the value of the counter is cleared each time the slave shaft passes through one of virtual grids set in the slave shaft, if the value of the counter is the virtual grid interval amount divided by two < the counter value ≦ the virtual grid interval amount when the master shaft is at a first one of grids of the master shaft after the single dog is turned off, the determined positional relationship is that the slave shaft is behind the master shaft in the origin direction, and if the value of the counter is 0 ≦ the counter value ≦ the virtual grid interval amount divided by two when the master shaft is at the first grid after the single dog is turned off, the determined positional relationship is that the slave shaft is ahead of the master shaft in the origin direction.

8. The numerical control method as claimed in claim 6, wherein:

the counter counts a virtual grid interval amount of the slave shaft and the value of the counter is cleared each time the slave shaft passes through an intermediate point between virtual grids set in the slave shaft, if the value of the counter is 0 ≦ the counter value ≦ the virtual grid interval amount divided by two when the master shaft is at a first one of grids after the single dog is turned off, the determined positional relationship is that the slave shaft is behind the master shaft in the origin direction, and if the value of the counter is the virtual grid interval amount divided by two < the counter value ≦ the virtual grid interval amount when the master shaft is at the first grid after the dog is turned off, the determined positional relationship is that the slave shaft is ahead of the master shaft in the origin direction.

9. The numerical control method as claimed in claim 1, further comprising setting virtual grids in the slave shaft at positions parallel to grids of the master shaft, wherein the virtual grids are used in determining the positional relationship.

10. A numerical control apparatus for controlling a machine having two moving shafts placed in parallel and separate servomotors, each driving one of the two shafts, where the two shafts are driven in same direction and one of the two shafts is a master shaft and the other is a slave shaft, and the numeric control apparatus performs a return to an origin of the master shaft and the slave shaft according to a dog technique, the numerical control apparatus comprising:

a position determination means for determining a positional relationship as to whether or not the slave shaft is ahead of the master shaft in an origin direction; and return-to-origin management means for performing the return to the origin of the master shaft and the slave shaft with a single dog based on the determined positional relationship.

11. The numerical control apparatus as claimed in claim 10, wherein:

virtual grids are set in the slave shaft at positions parallel to grids of the master shaft, when the determined positional relationship indicates that the slave shaft is behind the master shaft in the origin direction, the return-to-origin management means performs return to the origin of the master shaft based on a first value resulting from adding a grid interval amount of the master shaft and an origin shift amount and performs return to the origin of the slave shaft based on a second value resulting from adding a distance from a position of the slave shaft when the master shaft arrives at a first one of the grids after stepping on the single dog to a position of the slave shaft arriving at a first one of the virtual grids, a virtual grid interval amount of the slave shaft, and the origin shift amount, and when the determined positional relationship indicates that the slave shaft is ahead of the master shaft in the origin direction, the return-to-origin management means performs return to the origin of the master shaft based on the first value resulting from adding the grid interval amount of the master shaft and the origin shift amount and performs return to the origin of the slave shaft based on the second value resulting from adding the distance from the position of the slave shaft when the master shaft arrives at the first grid after stepping on the single dog to the position of the slave shaft arriving at the first virtual grid, and the origin shift amount.

12. The numerical control apparatus as claimed in claim 11, wherein the position determination means comprises a counter for counting the virtual grid interval amount of the slave shaft, and wherein when determining the positional relationship as to whether or not the slave shaft is ahead of the master shaft toward the origin direction, the position determination means uses the counter to determine the positional relationship.

13. The numerical control apparatus as claimed in claim 12, wherein:

the counter is cleared each time the slave shaft passes through one of the virtual grids, if the value of the counter is the virtual grid interval amount divided by two < the counter value $\leq$ the virtual grid interval amount when the master shaft is at the first grid after the single dog is turned off, the position determination means determines that the slave shaft is behind the master shaft in the origin direction, and if the value of the counter is 0 $\leq$ the counter value $\leq$ the virtual grid interval amount divided by two, the position determination means determines that the slave shaft is ahead of the master shaft in the origin direction.

14. The numerical control apparatus as claimed in claim 12, wherein:

the counter is cleared each time the slave shaft passes through an intermediate point between the virtual grids, if the value of the counter is 0 $\leq$ the counter value $\leq$ the virtual grid interval amount divided by two when the master shaft is at the first grid after the single dog is turned off, the position determination means determines that the slave shaft is behind the master shaft in the origin direction, and if the value of the counter is the virtual grid interval amount divided by two < the counter value $\leq$ the virtual grid interval amount, the position determination means determines that the slave shaft is ahead of the master shaft in the origin direction.

15. The numerical control apparatus as claimed in claim 10, wherein the position determination means comprises a counter for counting a virtual grid interval amount of the slave shaft, and wherein when determining the positional relationship as to whether or not the slave shaft is ahead of the master shaft toward the origin direction, the position determination means uses the counter to determine the positional relationship.

16. The numerical control apparatus as claimed in claim 15, wherein:

the counter is cleared each time the slave shaft passes through one of virtual grids, if the value of the counter is the virtual grid interval amount divided by two < the counter value $\leq$ the virtual grid interval amount when the master shaft is at a first one of grids after the single dog is turned off, the position determination means determines that the slave shaft is behind the master shaft in the origin direction, and if the value of the counter is 0$\leq$ the counter value $\leq$ the virtual grid interval amount divided by two, the position determination means determines that the slave shaft is ahead of the master shaft in the origin direction.

17. The numerical control apparatus as claimed in claim 15, wherein:

the counter is cleared each time the slave shaft passes through an intermediate point between virtual grids, if the value of the counter is 0 $\leq$ the counter value $\leq$ the virtual grid interval amount divided by two when the master shaft is at a first one of grids after the single dog is turned off, the position determination means determines that the slave shaft is behind the master shaft in the origin direction, and if the value of the counter is the virtual grid interval amount divided by two < the counter value $\leq$ the virtual grid interval amount, the position determination means determines that the slave shaft is ahead of the master shaft in the origin direction.

18. The numerical control apparatus as claimed in claim 10, wherein the slave shafts comprises virtual grids set at positions parallel to grids of the master shaft, so as to facilitate determining of the positional relationship.

* * * * *